(12) United States Patent
Terashima et al.

(10) Patent No.: US 7,854,012 B2
(45) Date of Patent: Dec. 14, 2010

(54) CONTENTS PLAYER, PROGRAM, AND METHOD

(75) Inventors: Yoshiki Terashima, Kawasaki (JP);
Keiichi Teramoto, Kawasaki (JP);
Tooru Kamibayashi, Chigasaki (JP);
Seiichi Nakamura, Inagi (JP); Eita Shuto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1278 days.

(21) Appl. No.: 11/354,834

(22) Filed: Feb. 16, 2006

(65) Prior Publication Data

US 2006/0218189 A1   Sep. 28, 2006

(30) Foreign Application Priority Data

Feb. 17, 2005   (JP)   ............... 2005-040911

(51) Int. Cl.
*G06F 7/04* (2006.01)
*H04N 7/16* (2006.01)

(52) U.S. Cl. .............. 726/30; 726/17; 726/18; 726/19; 726/20; 725/30; 380/202

(58) Field of Classification Search .......... 726/32, 726/27, 30; 380/211
See application file for complete search history.

(56) References Cited

U.S. PATENT DOCUMENTS 7,307,934 B1 * 12/2007 Miyazaki ............ 369/53.31

2004/0131334 A1 * 7/2004 Jung et al. ............ 386/69
2004/0139338 A1 * 7/2004 Ohmori et al. ............ 713/193
2004/0236588 A1 * 11/2004 Millard et al. ............ 705/1

FOREIGN PATENT DOCUMENTS

| JP | 11-355759 | 12/1999 |
| JP | 2003-264748 | 9/2003 |

OTHER PUBLICATIONS

U.S. Appl. No. 11/608,960, filed Dec. 11, 2006, Terashima, et al.

* cited by examiner

*Primary Examiner*—Taghi T Arani
*Assistant Examiner*—Thaddeus Plecha
(74) *Attorney, Agent, or Firm*—Oblon, Spivak, McClelland, Maier & Neustadt, L.L.P.

(57) ABSTRACT

A contents player including: a reading unit which accesses data carrier and reads out contents including multimedia data and a script from the data carrier; a playing unit which plays the multimedia data included in the contents; an interpreting unit which interprets the script included in the contents; an access unit which accesses an internal or external storing device; an acquiring unit which acquires an access ID of the contents from the read contents or the data carrier when the script includes an access instruction description which instructs access to a specific storing region in the storing device; and a determining unit which determines whether the access to the specific storing region is permitted or not, on the basis of the acquired access ID.

7 Claims, 10 Drawing Sheets

CONTENTS PLAYER, PROGRAM, AND METHOD

CROSS-REFERENCE TO RELATED APPLICATIONS

This application is based upon and claims the benefit of priority from the prior Japanese Patent Applications No. 2005-40911, filed on Feb. 17, 2005; the entire contents of which are incorporated herein by reference.

BACKGROUND OF THE INVENTION

1. Field of the Invention

The present invention relates to a contents player, program, and method which plays multimedia data.

2. Related Art

In a conventional contents player for television broadcasting and a DVD, contents are provided to a user such that multimedia data such as a moving image or audio data is merely broadcasted or played. In recent years, in order to provide more interactive contents to a user, a configuration which causes a contents player to execute not only an ordinary playing function but also various functions cooperating with playing of multimedia data such as a function of designating a display position or a playing timing of multimedia data including a still image, character information, or the like, a function of detecting a remote control input from a user to reflect the remote control input on a screen, and a function of communicating with a server device on the Internet or a home network is realized. For example, the configuration has been realized to digital broadcasting which starts in recent years or game contents.

In particular, as a method of describing contents cooperating with multimedia data such as a video image, audio data, and a still image, as shown in BML (Broadcast Markup Language) and HTML (Hypertext Markup Language) and SMIL (Synchronized Multimedia Integrate Language), entire contents are described in a XML—(extensible Markup Language) based language, and processing description by script languages JavaScript or ECMAScript is written in an XML document, and an interactive function is called as API from a script.

In such contents having interactivity, a function of storing contents related information set or acquired by an operation by a user in a storing medium through a contents player and a function of reading out the contents related information from the storing medium are also used. The functions are used as described below. That is, for example, with regard to video contents such as a DVD, a display language setting set by a user is stored in a built-in memory, and save data such as a high score of a game is stored with regard to game contents.

Japanese Patent Laid-Open No. 2001-337864 proposes a method in which an application program operated on an operating system of another computer prepares data called a policy file when data is read or written from/in a data storing device connected to the computer, records access control information in the policy file, and refers to the access control information to realize access controls for respective applications.

Japanese Patent Laid-Open No. 2004-5084 proposes a method in which an access management mechanism transparently provides access control information for data written in the data storing device by the application program and refers to the access control information to realize access controls of respective applications.

In a conventional storing mechanism of data from contents is mainly used a method that small amount of setting information is written in a limited storing destination such as a memory built in a contents player or a storing device inserted into a specific slot of the contents player. For example, in digital broadcasting, it is determined that, as a data storing destination, one built-in memory (NVRAM: a nonvolatile memory in which contents are not erased in an OFF state) is necessarily included in a digital television serving as a contents player. In digital broadcasting, a document for contents control is described in contents by a specification descriptive language BML (Broadcast Markup Language) and a script Language ECMAScript. As API available from the ECMAScript, API for simple reading and writing of data is defined for a built-in memory.

However, with diversification of contents in future digital broadcasting, contents having higher interactivity are expected to be developed for an advanced DVD player in the future, an advanced recorder in the future, a mobile AV terminal which can hold AV contents in SD card, or the like. In the contents having the higher interactivity, it can be considered that a function of reading or writing variable data from/in an arbitrary storing device such as an SD card or an NAS (Network Attached Storage) is desired. For example, the following using method is supposed.

An arbitrary screen shot in video contents is stored in an SD card connected to a contents player. A user moves the SD card to a printer to perform printing.

A large amount of privileged video data related to certain contents is downloaded from a server and stored in the NAS in the home network. When the user plays the contents, the contents access the NAS to play the privileged video data to make the user possible to view the privileged video image.

Here, when reading and writing of data X stored by certain regular contents are not restricted in any way, for example, when a user plays malicious contents without noting the contents being malicious contents, the data X may be disadvantageously stolen from the malicious contents or altered or deleted. On the other hand, when the presence of data X stored by certain regular contents is detected by other regular contents of the same provider, a service which causes new extra contents to appear as a privilege for a user who purchases a large number of contents can be supposed.

Therefore, any access limitation mechanism which can set accessibility/inaccessibility per contents or providers to the data X which has stored by certain contents is desired.

However, in the conventional technique, there is no method of making it possible to read and write data from digital broadcasting or contents such as DVD contents to an arbitrary storing device such as an SD card or a NAS in consideration of access limitation per contents or providers.

On the other hand, as one service cooperating with contents, the appearance of a service which performs not only reading and writing of data from the contents but also control of an in-house device such as a household electrical appliance, audio-video equipment, or a toy may be considered. For example, the service includes transmission of an instruction of reservation of recording from an EPG (Electronic Program Guide) to an HDD recorder. Also this case is in danger of unintentionally operating the in-house device by playing malicious contents. However, there is not method of making it possible to control the in-house device in consideration of access limitation.

SUMMARY OF THE INVENTION

According to an aspect of the present invention, there is provided with a contents player comprising: a reading unit which accesses data carrier and reads out contents including multimedia data and a script from the data carrier; a playing unit which plays the multimedia data included in the contents; an interpreting unit which interprets the script included in the contents; an access unit which accesses an internal or external storing device; an acquiring unit which acquires an access ID of the contents from the read contents or the data carrier when the script includes an access instruction description which instructs access to a specific storing region in the storing device: and a determining unit which determines whether the access to the specific storing region is permitted or not, on the basis of the acquired access ID.

According to an aspect of the present invention, there is provided with a program which causes a computer to: access data carrier and read out contents including multimedia data and a script from the data carrier; play the multimedia data included in the contents; interpret the script included in the contents; acquire an access ID of the contents from the read contents or the data carrier when the script includes an access instruction description which instructs access to a specific storing region in a storing device; and determine whether the access to the specific storing region is permitted or not, on the basis of the acquired access ID.

According to an aspect of the present invention, there is provided with a method comprising: accessing data carrier and reading out contents including multimedia data and a script from the data carrier; playing the multimedia data included in the contents; interpreting the script included in the contents; acquiring an access ID of the contents from the read contents or the data carrier when the script includes an access instruction description which instructs access to a specific storing region in a storing device; and determining whether the access to the specific storing region is permitted or not, on the basis of the acquired access ID.

DETAILED DESCRIPTION OF THE INVENTION

Embodiments of the present invention will be described in detail with reference to the accompanying drawings.

First Embodiment

Figure 1:
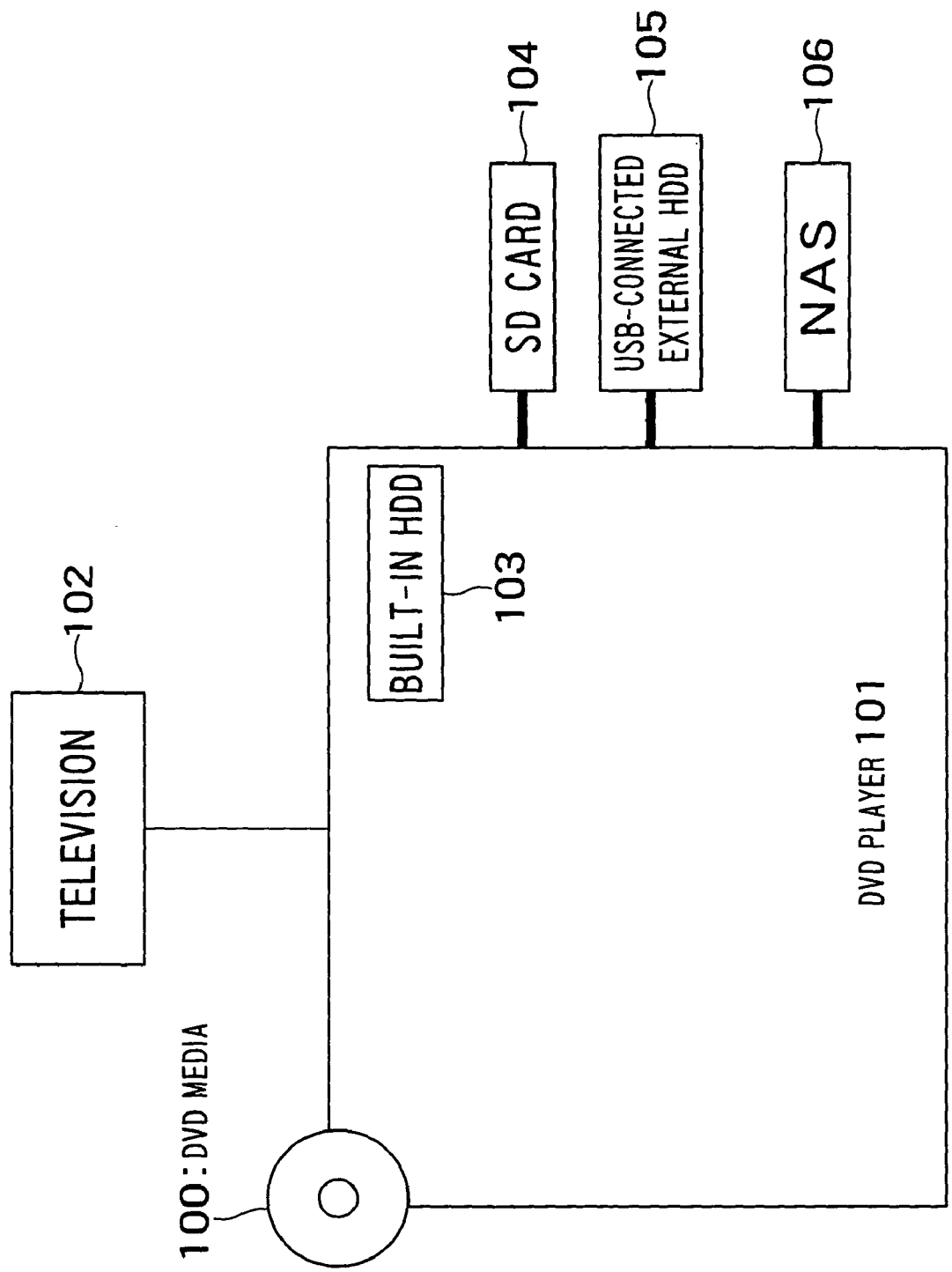
FIG. 1 is a block diagram schematically showing a configuration of a contents playing system including a contents player according to the embodiment.

FIG. 1 is a block diagram schematically showing a configuration of a contents playing system including a contents player (contents reproducing apparatus) according to the embodiment.

FIG. 1 shows a DVD media 100 (data carrier) serving as a medium in which contents are stored, a DVD player (contents player) 101 which reads out the contents in the DVD media 100 to play multimedia data and performs interpretation, execution of a script, and a television 102 which is connected to the DVD player (contents player) 101 and which displays the multimedia data in the DVD media 100. As a storing device from or in which data is read or written, a built-in HDD 103 built in the DVD player (contents player) 101, an SD card 104 inserted into an SD slot, an external HDD 105 connected by a USB, and an NAS (Network Attached Storage) 106 LAN-connected through an Ethernet or a wireless LAN are shown. The storing devices 104 to 106 are connected to the DVD player (contents player) 101 to make it possible to exchange data with the DVD player 101. The built-in HDD corresponds, for example, an internal storing device. The SD card 104, the external HDD and the NAS 106 correspond, for example, an external storing device.

Figure 2:
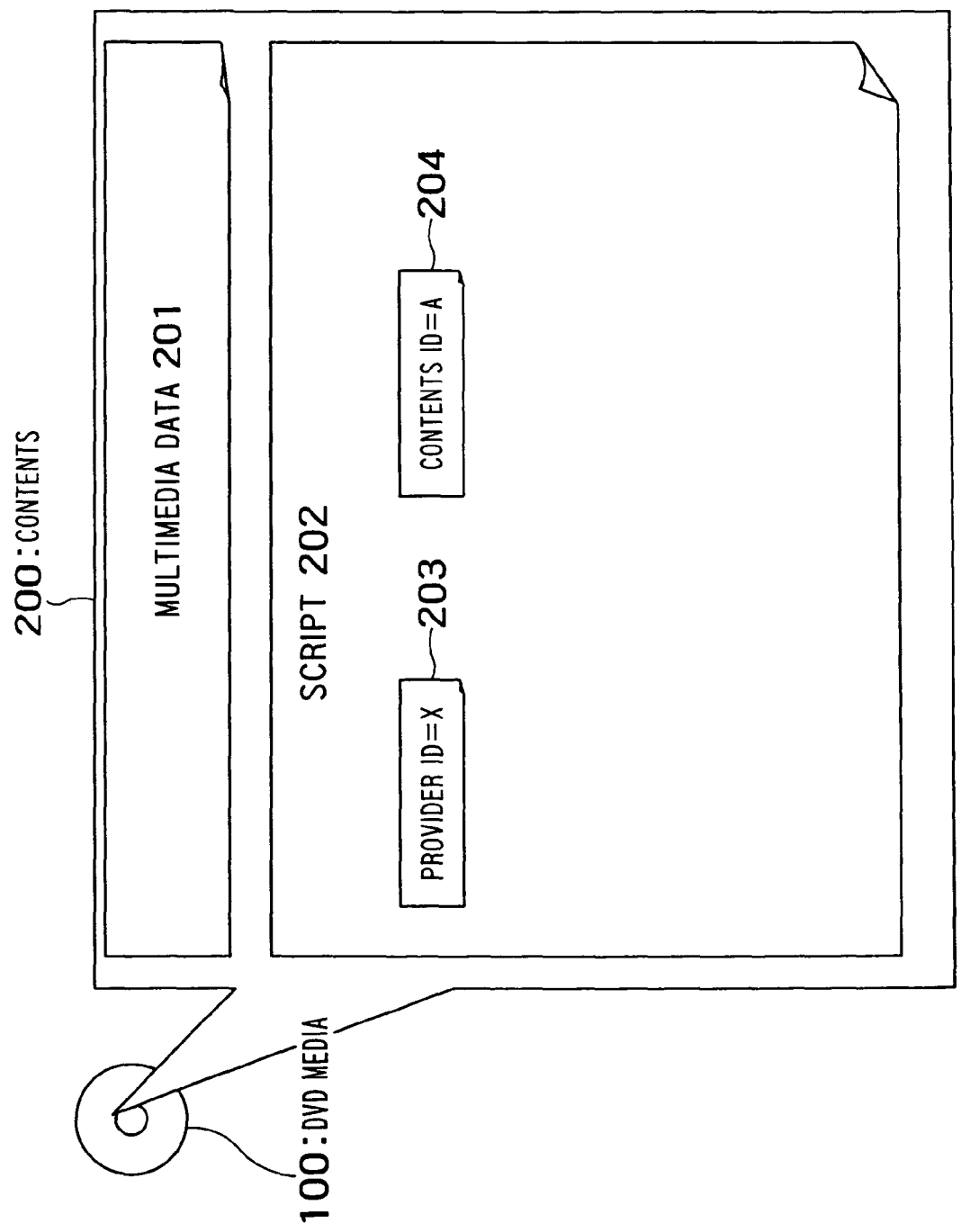
FIG. 2 is a diagram showing a data structure of contents in a DVD media.

FIG. 2 is a diagram showing a data structure of contents in the DVD media 100.

The DVD media 100 stores contents 200 therein. The contents 200 include multimedia data 201 such as a moving image, audio data, a still image, and a text. The contents 200 include a script 202 constituted by a description for designating a display position and a display timing of the multimedia data 201 and a description of an arbitrary procedure such as a data write instruction to a storing device. In the embodiment, it is assumed that the script 202 is described by XML and ECMAScript which are used in current digital broadcasting.

The DVD media 100 holds an access ID which can be referred from the script 202, more specifically, a provider ID 203 and a contents ID 204. It is assumed that the provider ID 203 is different from other provider ID depending on manufacturers (contents providers) and that the contents ID 204 is different from other contents ID depending on contents. The provider ID 203 is a character string having a length set such that the character string does not collide with the other provider IDs. The contents ID 204 is a character string having a length set such that the character string does not collide with the other contents IDs. In the embodiment, for descriptive convenience, it is assumed that contents having "different provider IDs and the same contents IDs" do not exist.

It is assumed that the provider ID 203 and the contents ID 204 cannot be easily stolen or presumed by the third party. In order to cause the script 202 to acquire the provider ID 203 and the contents ID 204, for example, the DVD player 101 reads out raw data stored in a specific region in the DVD media 100 and returns a result obtained by the reading to the script 202. The DVD player 101 may get a provider ID and a contents ID by communicating with a specific server device on the basis of the read raw data. The DVD player 101 may get a provider ID and a contents ID by inputting the read raw data to some calculating formula. The provider ID and the contents ID may be also buried in the script 202 as character strings. In the embodiment, it is assumed that the provider ID 203 and the contents ID 204 are directly buried in the script 202 as:

var providerID="594f803b380a41396ed63dca39503542"; and var contentsID="74b87337454200d4d33f80c4663dc5e5", respectively. In this case, it is assumed that the script 202 itself is encrypted by some encrypting method to prevent the script 202 from being easily intercepted and that the encrypted script is decrypted by only the DVD player 101.

In FIG. 2, an example in which one of the contents 200 is included in one DVD media 100 is shown. A plurality of contents may be included in one DVD media 100. In this case, the provider ID 203 and the contents ID 204 are held in units of contents.

Figure 3:
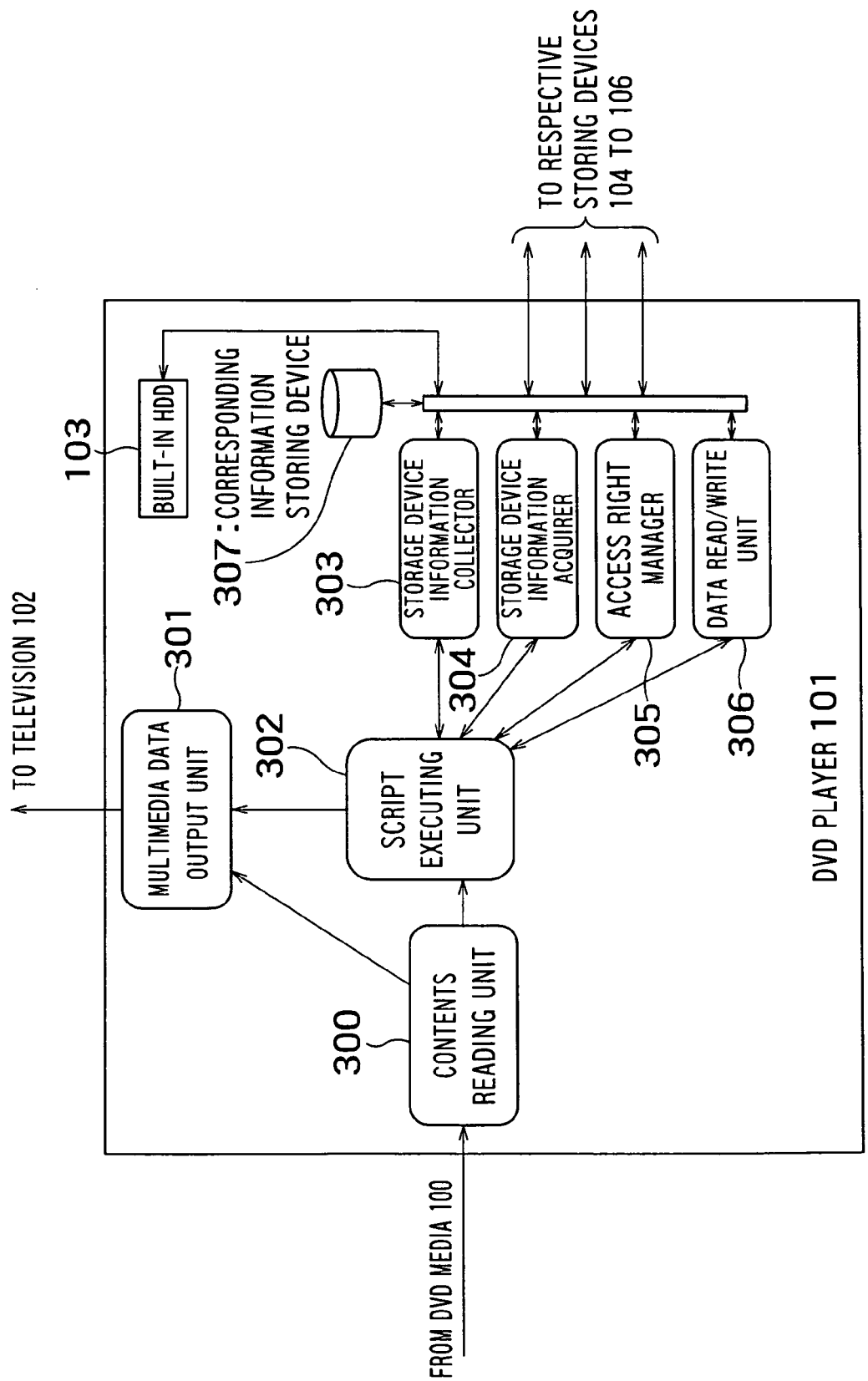
FIG. 3 is a diagram schematically showing an internal configuration of a DVD player.

FIG. 3 is a block diagram schematically showing an internal configuration of the DVD player 101 shown in FIG. 1.

FIG. 3 shows a contents reading unit 300 which reads out the contents 200 in the DVD media 100, a multimedia data output unit 301 which plays the multimedia data 201 in the contents 200 to output the played multimedia data to the television 102, and a script executing unit 302 which interprets the script 202 in the contents 200 to execute a process according to the description of the script 202. The multimedia data output unit 301 corresponds, for example, a playing unit. The script executing unit 302 includes, for example, an interpreting unit. As function units which perform an operation for each storing device in cooperation with the script executing unit 302, a storing device information collector 303, a storing device information acquirer 304, an access right manager 305, a data read/write unit 306, and a corresponding information storing device 307 are shown. The access right manager 305 corresponds, for example, an acquiring unit, a determining unit and a checking unit. The data read/write unit 306 corresponds, for example, an access unit and a control data generating unit.

The contents reading unit 300 has a function which reads out the contents 200 in the DVD media 100 to give the multimedia data 201 and the script 202 to the multimedia data output unit 301 and the script executing unit 302, respectively. More specifically, the contents reading unit 300 has a data separating function which separates the multimedia data 201 and the script 202 from the contents 200. In addition, the contents reading unit 300 decrypts the contents 200 as a whole when the contents 200 are encrypted as a whole. More specifically, the contents reading unit 300 has a decrypting function. Since the data separating function and the data decrypting function are known techniques, a detailed description thereof will be omitted.

The multimedia data output unit 301 plays the multimedia data 201 received from the contents reading unit 300 to display the played multimedia data on the television 102. The multimedia data output unit 301 also adjusts a display position and a display timing of multimedia data according to a designation received from the script executing unit 302. The multimedia data output unit 301 includes another function required to play multimedia data such as a decoding function for video data and audio data.

The script executing unit 302 interprets and executes the script 202 received from the contents reading unit 300. In the embodiment, a description obtained by XML and ECMAScript is supposed as the script 202. The script executing unit 302 performs a designation for a display position and a display timing of the multimedia data 201 to the multimedia data output unit 301 on the basis of the description contents of XML. The script executing unit 302 performs interrupt control, timer control, and the like on the basis of the description contents of ECMAScript. Since the basic functions processed by XML and the ECMAScript are known matters, a detailed description thereof will be omitted.

The details of the storing device information collector 303, the storing device information acquirer 304, the access right manager 305, the data read/write unit 306, and the corresponding information storing device 307 will be described later. As the data read/write unit 306, a set of data write units for respective storing devices such as a data read/write unit for the built-in HDD 103 and a data read/write unit for the SD card 104 may be expressed. As a single function unit, all data read/write functions for the storing devices 103 to 106 can be performed.

As an example for reading/writing data from contents to a storing device, an example in which a screen shot of an arbitrary scene of a video image is stored as image data in the SD card 104 by a remote-control operation performed by a user during playing of the contents 200 in the DVD media 100 by the DVD player 101 will be described below. An example in which, from the same contents as the contents which have stored image data, the image data can be read out will be described. An example in which, from contents different from the contents which have stored image data, the image data cannot be read out will be described.

An example of a process flow described as the script 202 will be described below with reference to FIGS. 4 and 5. Thereafter, an actual manner of performing a process described as the script 202 by the DVD player 101 will be described below with reference to FIGS. 6-8.

Figure 4:
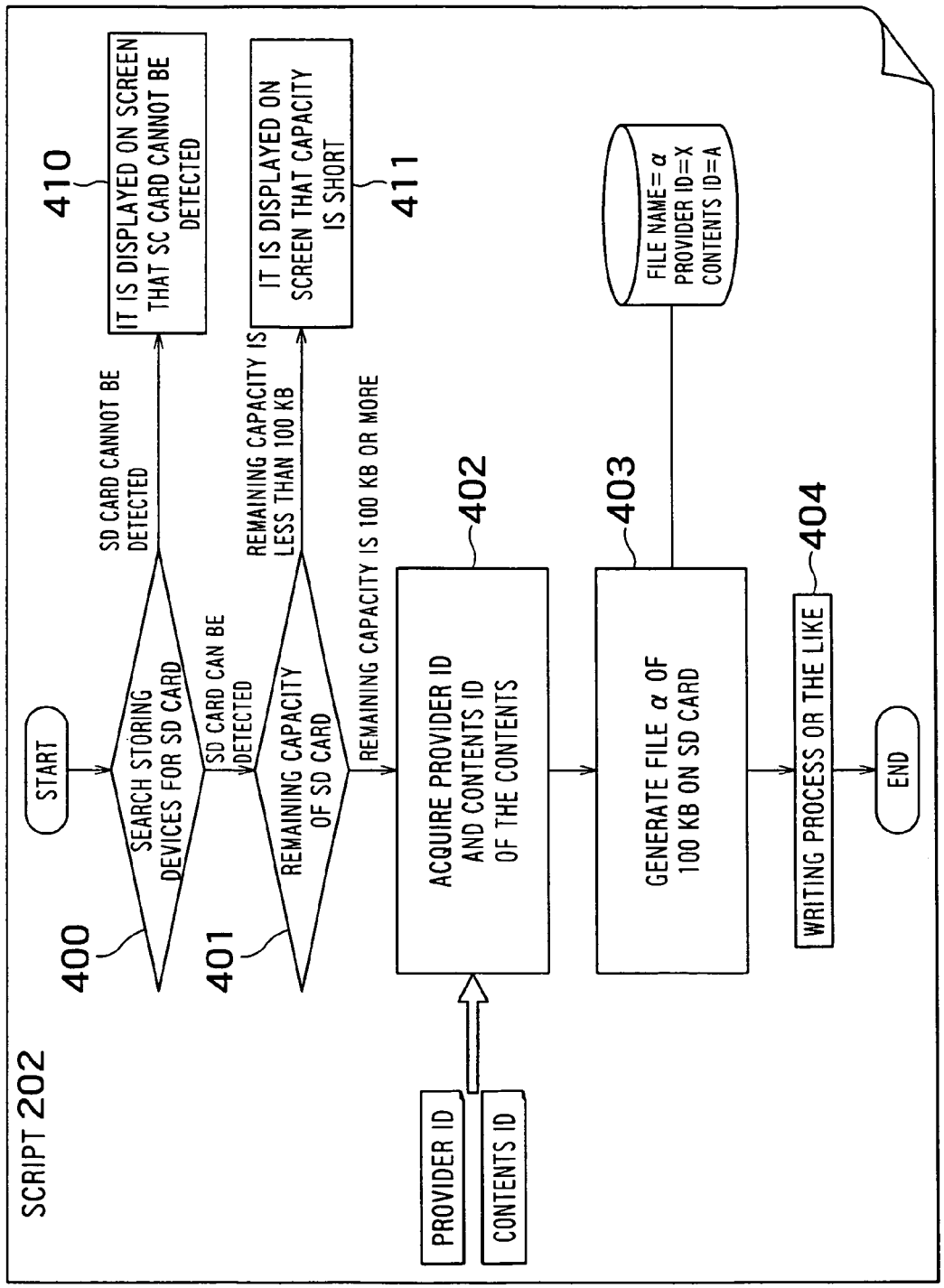
FIG. 4 is a flow chart for explaining a flow of a data storing process by a script.

FIG. 4 is a flow chart for explaining a flow of data storing process performed by the script 202. More specifically, FIG. 4 shows a process flow of the script 202 when a screen shot of an arbitrary scene of a video image is stored in the SD card 104 as image data by a remote-control operation performed by a user during playing of the contents 200 in the DVD media 100 by the DVD player 101.

The script 202 includes, as an assumption, a description for text display such as "Is screen shot stored in SD card? Yes/No" described by XML or a description of event detection that a series of processes by ECMAScript are started when "Yes" is selected by a remote-control operation by the user.

As a flow of a data storing process in the SD card 104, first, it is checked whether the SD card 104 is inserted into the DVD player 101 or not (400). When the SD card 104 is not inserted into the DVD player 101, it is displayed on the television 102 that the SD card 104 is not inserted into the DVD player 101, and the process is ended (410).

When the SD card 104 is inserted into the DVD player 101, the byte size of a screen shot to be stored here is recognized as 100 KB, and it is checked whether the SD card 104 has a free area of 100 KB or more or not (401). When the free space is short, it is displayed on the television 102 that the free space is short, and the process is ended (411).

The script 202 acquires the provider ID 203 and the contents ID 204 of the contents 200 (402).

As described above, as the provider ID 203 and the contents ID 204, the character strings:

var providerID="594f803b380a41396ed63dca39503542"; and var contentsID="74b87337454200d4d33f80c4663dc5e5"

directly described in the script are used. In the following description and drawings, the character strings are expressed as provider ID=X and contents ID=A, respectively, for descriptive convenience.

By using the provider ID=X and the contents ID=A as arguments, a file (data storing region) α having 100 KB is generated (403).

When the file α is generated, data of a screen shot is actually written in the file α (404). More specifically, the script executing unit 302 executes the script 202 to generate the file α assigned the provider ID=X and the contents ID=A on the SD card 104. A manner of managing a relationship among the provider ID=X, the contents ID=A, and the file α will be described later with reference to FIGS. 7 and 8.

Figure 5:
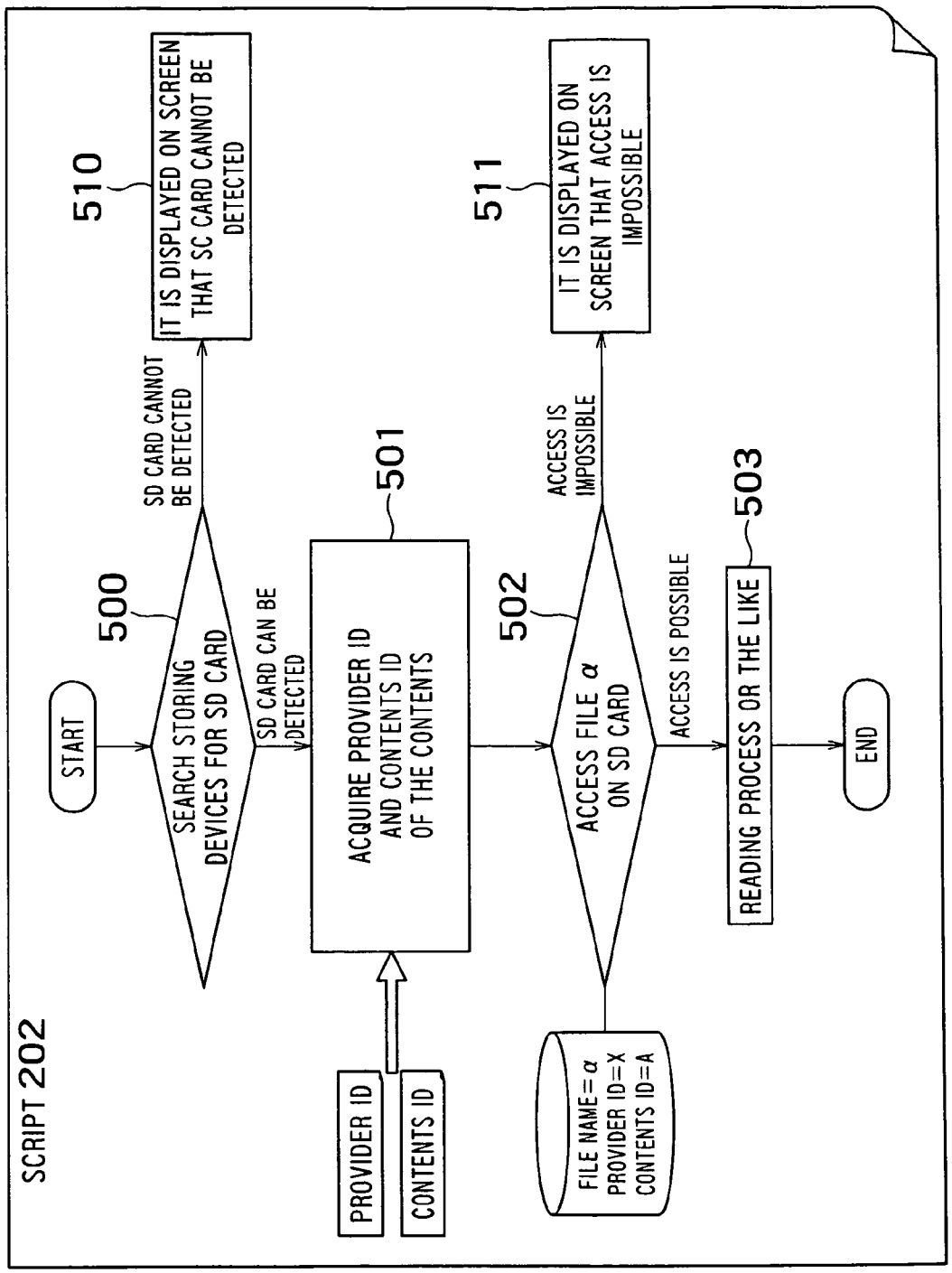
FIG. 5 is a flow chart for explaining a flow of a data reading process by a script.

FIG. 5 is a flow chart for explaining a flow of a data reading process performed by the script 202. More specifically, FIG. 5 shows a process flow of the script 202 when image data of a screen shot is read out from the SD card 104 and displayed on the television 102 by a remote-control operation performed by a user during playing of the contents 200 in the DVD media 100 by the DVD player 101.

The script 202 includes, as an assumption, a description for text display such as "Is screen shot stored in SD card is displayed? Yes/No" described by XML or a description of event detection that a series of processes by ECMAScript are started when "Yes" is selected by a remote-control operation by the user.

As a flow of a data storing process from the SD card 104, first, it is checked whether the SD card 104 is inserted into the DVD player 101 or not (500). When the SD card 104 is not inserted into the DVD player 101, it is displayed on the television 102 that the SD card 104 is not inserted into the DVD player 101, and the process is ended (510).

When the SD card 104 is inserted into the DVD player 101, the script 202 acquires the provider ID 203 and the contents ID 204 of the contents 200 (501). As described above, as the provider ID 203 and the contents ID 204, the character strings described in the script are used. The file α on the SD card 104 is accessed by using the provider ID and the contents ID as arguments (502).

Also in the embodiment, if the values of the provider ID and the contents ID are equal to those in FIG. 4:

var providerID="594f803b380a41396ed63dca39503542"; and var contentsID="74b87337454200d4d33f80c4663dc5e5", i.e., the provider ID=X and the contents ID=A, the script 202 in FIG. 5 determines the data of the stored file α can be read and written. Processes of reading the data of the screen shot from the SD card 104 and displaying the read data on the screen of the television 102 are performed (503).

If at least one of the provider ID and the contents ID is different, a result representing that access is impossible is returned to the script 202. The script 202 displays an image representing that access is impossible on the television 102 (511).

In the above description, possibility/impossibility to access the SD card 104 is decided such that the script executing unit 302 exchanges data with the access right manager 305. The result is returned to the script 202. This will be described later with reference to FIGS. 7 and 8.

In the explanation in FIGS. 4 and 5, when certain contents generates the file α by using the provider ID=X and the contents ID=A as arguments, only contents which can know the same provider ID=X and the contents ID=A can perform reading and writing of the file α. Furthermore, in the embodiment, depending on a way of handling an argument in generation of a file, the following limitations can be put on the contents.

| | In generation of file, both provider ID = X and contents ID = A are designated. | In generation of file, only provider ID = X is designated. contents ID is not designated. | In generation of file, both provider ID and contents ID are not designated. |
|---|---|---|---|
| Contents having provider ID = X and contents ID = A | Readable/writable | Readable/writable | Readable/writable |
| Contents having provider ID = X and contents ID = B | Unreadable/ unwritable | Readable/writable | Readable/writable |
| Contents having provider ID = Y and contents ID = C | Unreadable/ unwritable | Unreadable/unwritable | Readable/writable |

The above limitations in units of provider IDs and contents IDs can prevent data stored by certain contents from being stolen, altered, and deleted by playing malicious contents. In addition, the limitations in units of provider IDs makes it possible to provide the following services in units of providers. That is, for example, a user which has seen certain contents A sees other contents B of the same provider, a script in the contents B checks whether data stored by the contents A in past times is present in the storing device or not. When the data is present, extra contents is provided from the contents B to the user.

Figure 6:
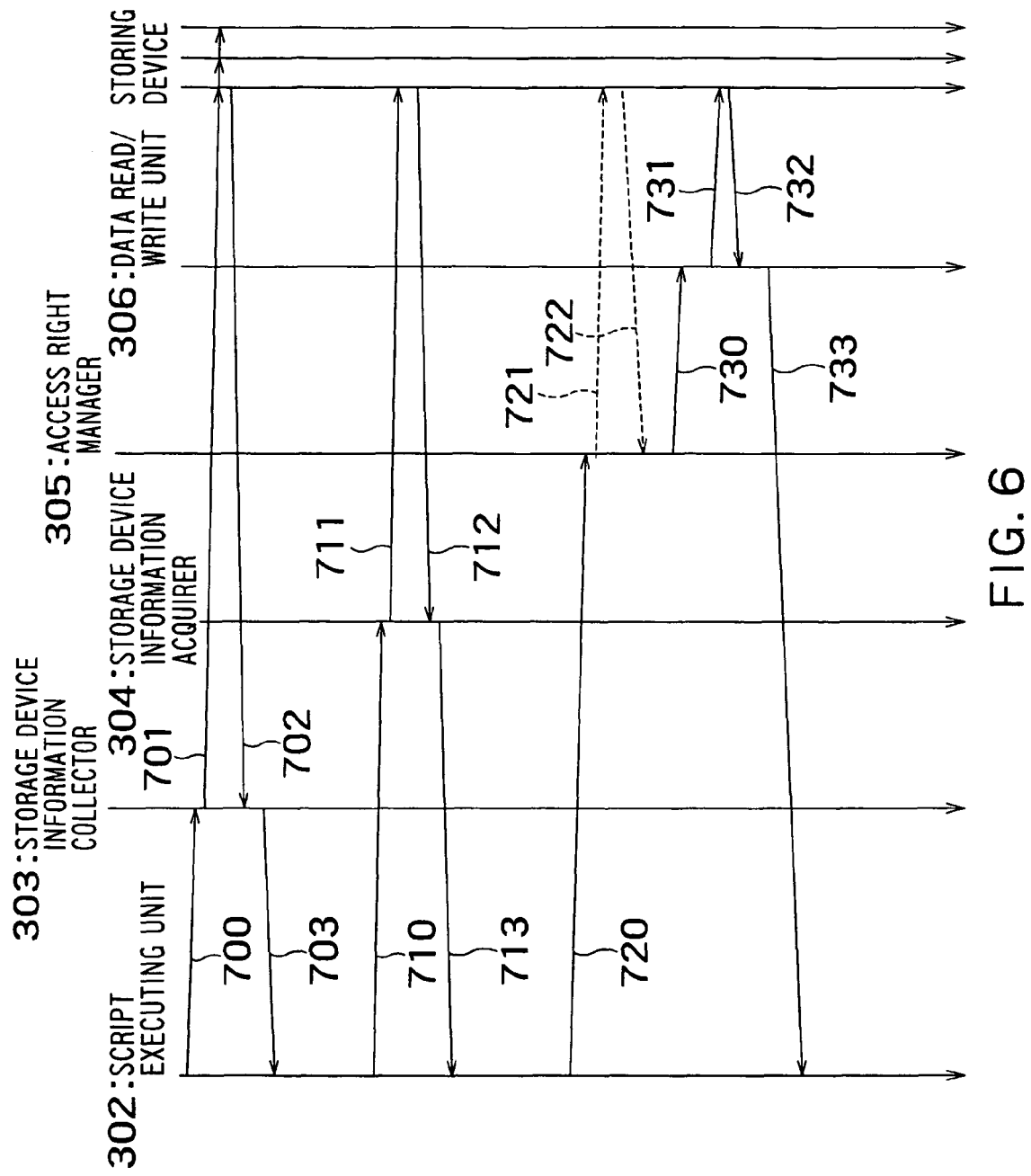
FIG. 6 is a diagram for explaining a relationship between functional units when a script is executed by a script executing unit.

FIG. 6 shows a relationship among the storage device information collector 303, the storage device information acquirer 304, the access right manager 305, and the data read/write unit 306 when the script 202 shown in FIGS. 4 and 5 is executed by the script executing unit 302. In the respective procedures in FIGS. 4 and 5, ways of working of these function units will be described below.

(1) When the script executing unit 302 interprets a description of retrieving of a storing device described in procedures 400 and 500 (700), the storage device information collector 303 detects a storing device(s) connected to the DVD player 101 at the present (701, 702).

Depending on configurations such as the built-in HDD 103, the SD card 104, the USB-connected external HDD 105, and the LAN-connected NAS 106 to which the storing device can be connected, the storage device information collector 303 detects a device by a means (communication protocol) coping with the configurations.

For example, in the case of the built-in HDD or the SD card, it is detected whether the built-in HDD or the SD card are physically connected into a specific slot of the DVD player 101 or not. In the case of the NAS, detection is performed by performing communication by a protocol such as an SMB (Server Message Block).

The obtained result is provided to the script 202 as an array of instances (objects) through the script executing unit 302 (703). Each instance indicates one storing device.

Corresponding information representing a manner of mapping the instances on the storing devices is stored in the corresponding information storing device 307. Subsequently, each time an operation to an instance is performed by the storage device information acquirer 304, the access right manager 305, or the data read/write unit 306, the corresponding information storing device 307 are referred to.

(2) A process of acquiring device information such as a process of acquiring a remaining capacity of the SD card 104 described in procedure 401 is described as a method to an instance in the script 202.

When the description is interpreted by the script executing unit 302 (710), the storage device information acquirer 304 acquires the information from the storing device mapped on the instance (711, 712).

The obtained result is returned to the script 202 as a return value of the method through the script executing unit 302 (713).

(3) A process of accessing a file, i.e., a process of reading the file α on the SD card 104 described in procedure 502 is also described as a method to an instance in the script 202.

When the description is interpreted by the script executing unit 302 (720), access right manager 305 decides whether the contents are permitted to access the file in the storing device mapped on the instance or not. This deciding method will be described later with reference to FIGS. 7 and 8. In this decision, as needed, the access right manager 305 may exchange information with the storing device (721, 722).

As a result of the decision, when the contents are prohibited from accessing a specific file, data representing the prohibition is returned to the script 202 as a return value of the method.

On the other hand, when the access is permitted, the process shifts from the access right manager 305 to the data read/write unit 306 (730), actual data is read from or written in a storing device mapped in an instance (731, 732).

The value of the read data or a value representing that the writing is succeeded is returned to the script 202 as a return value of a method through the script executing unit 302 (733).

Figure 7:
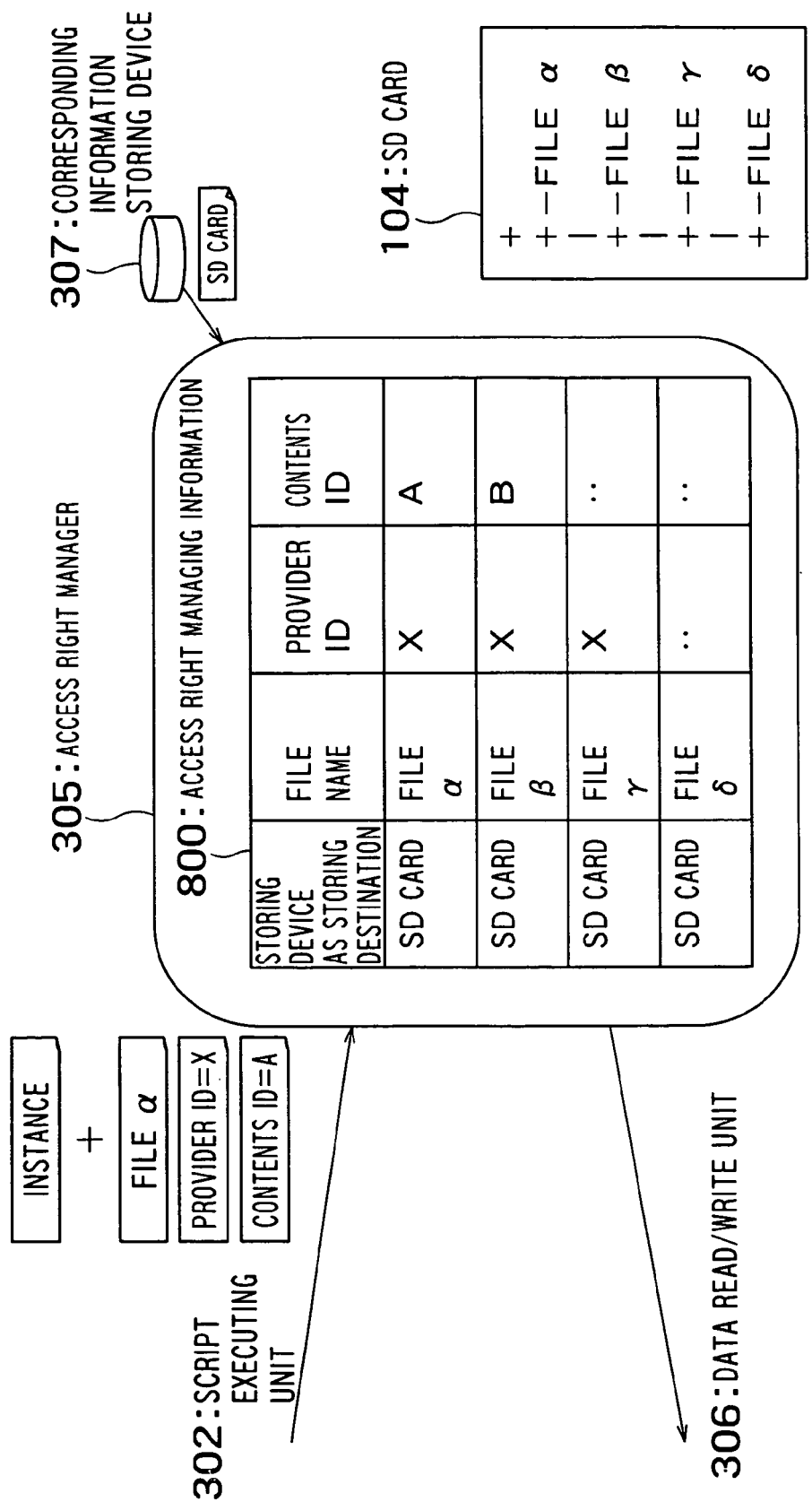
FIG. 7 is a diagram for explaining an example of a method of deciding accessibility/inaccessibility by an access right manager.
Figure 8:
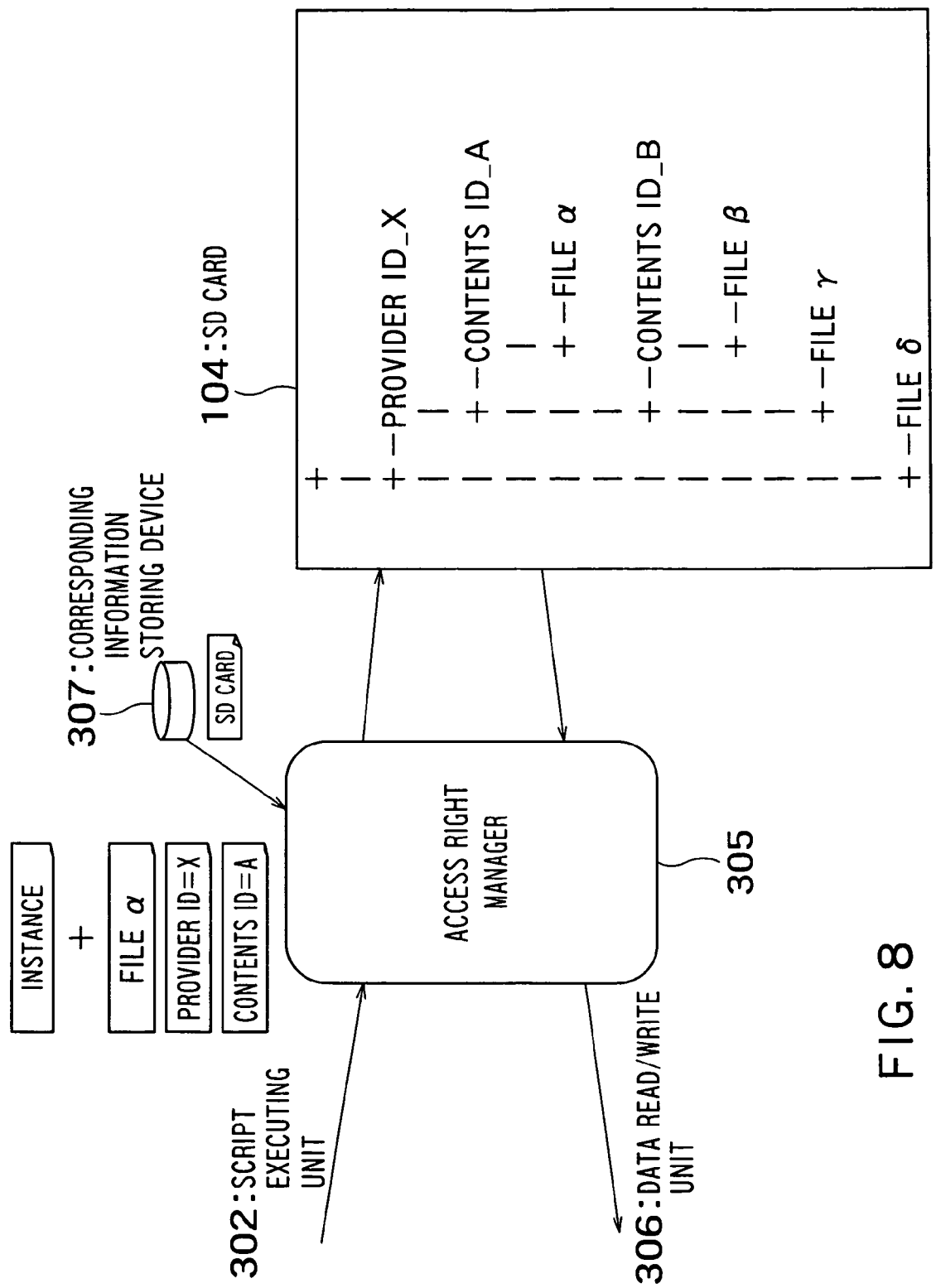
FIG. 8 is a diagram for explaining an example of a method of deciding accessibility/inaccessibility by the access right manager.

FIGS. 7 and 8 are diagrams for explaining examples of a method of deciding accessibility/inaccessibility by the access right manager 305. More specifically, FIG. 7 shows a method of deciding accessibility/inaccessibility by only the access right manager 305, and FIG. 8 shows a method of deciding accessibility/inaccessibility by the access right manager 305 and the storing device which cooperate with each other.

When the file is accessed by the description of the script 202, an instance, a file name, a provider ID and a contents ID representing a storing device are designated to the script 202 as arguments. When the script executing unit 302 interprets the script 202, the information including the instance, the file name, the provider ID, and the contents ID is given to the access right manager 305. The access right manager 305 checks a storing device on which instance information given by the script executing unit 302 is mapped, with reference to data stored in the corresponding information storing device 307. In the examples shown in FIGS. 7 and 8, the instance information is mapped on the SD card 104.

In the example in FIG. 7, when a file is generated in a storing device by a designation from the script executing unit 302, the access right manager 305 holds corresponding information including a storing destination device of the file, a file name, a provider ID and a contents ID as access right managing information 800. The access right managing information 800 shown in FIG. 7 includes an entry representing that a file having a file name a, the provider ID=X, and the contents ID=A is generated on the SD card 104. The decision of accessible/inaccessible is realized by referring to the entry in the access right managing information 800 and shifting the process to the data read/write unit 306 only when an entry is present.

The example in FIG. 8 shows a method which does not hold the access right managing information 800 in the access right manager 305 and which expresses the access right managing information 800 as a directory structure at a storing destination device.

(1) When is designated that a file having the file name=α, the provider ID=X, and the contents ID=A is generated on the SD card 104, a file having a path name: /providerID_X/contentsID_A/file_α is generated on the SD card 104.

(2) When only the file name=α and the provider ID=X are designated, a file having a path name: /providerID_X/file_α is generated.

(3) When only the file name=α is designated, a file having a path name:
/file_α is generated.

A decision of accessibility/inaccessibility is realized by regarding as follows:

(1) a file immediately below /providerID_X/contentsID_A can be accessed by only the provider ID=X and the contents ID=A, (2) a file immediately below /providerID_X can be accessed by contents of the provider ID=X, and (3) a immediately below/can be accessed by all the contents.

In the method in FIG. 7, a high-speed decision which can decides accessible/inaccessible without accessing a storing device can be obtained. However, a region in which the access right managing information 800 proportional to the number of storing devices is stored is required in the access right manager 305.

In the method in FIG. 8, a storing device must be accessed to decide accessible/inaccessible. However, the access right manager 305 does not require a larger storing region. Since the directory structure directly corresponds to access limiting, it is easily realized that all data (/providerID_X/contentsID_A/) stored by a certain provider ID and contents ID=A is moved at once.

In the method in FIG. 8, on the SD card 104, for example, when

/providerID_X/contentsID_A/file_α and, simply, the provider ID=X and the contents ID=A are directly used as a part of the directory name, when the SD card 104 is read out by an external PC or the like, the values of the provider ID and the contents ID are exposed. For this reason, a method of using a one-way hash value or the like obtained by MD5 of X or A as a directory name may be used.

Here, an example in which, when XML and ECMAScript are supposed as the script 202, the procedures shown in FIGS. 4 and 5 are actually described by ECMAScript will be described below.

As API available from ECMAScript, the following objects and methods are defined.

PStorage Object

An object expressing a storage. One PStorage instance expresses one storing device. A method is executed to the PStorage instance, so that data reading/writing or the like is performed to a storing device corresponding to the PStorage instance.

static PStorage[ ] getDevices(unsigned short DeviceType)

A list of storing devices designated as DeviceType is acquired. DeviceType can designate the next value as static value.

| | |
|---|---|
| PStorage.ALL | all storage devices |
| PStorage.EMBEDDED | built-in HDD or the like |
| PStorage.REMOVABLE | SD card or the like |
| PStorage.NETWORK | NAS or the like |
| PStorage.TOY | device to be controlled except | for the above devices
   unsigned int getSpace( ) raises(PStorageException);

Maximum capacity of storing device is acquired
   unsigned int getFreeSpace( ) raises(PStorage Exception);

Remaining capacity recordable on storing device is acquired
   unsigned short getDeviceType( ) raises(PStorage Exception);

Type of storage device is acquired
   String setManufacturer( ) raises(PStorageException);

Manufacturer name (provider name) of storing device is acquired
   String getName( ) raises(PStorage Exception);

Device name of storing device is acquired
   void Create(in String filename, unsigned int filesize) raises (PStorage Exception);
   void Create(in String filename, unsigned int filesize, in String ContentsID, in String providerID) raises(PStorage Exception);

File for storing data is generated on storing device
   void Delete(in String filename) raises(PStorage Exception);
   void Delete(in String filename, in String ContentsID, in String ProviderID) raises(PStorage Exception);

File for storing data is deleted from storing device
   boolean Exist(in String filename) raises(PStorage Exception);
   boolean Exist(in String filename, in String ContentsID, in String ProviderID) raises(PStorageException);

It is checked whether file is present on storing device or not
   FileStream openWrite(in String filename) raises(PStorageException);
   FileStream open Write(in String filename, in String ContentsID, in String ProviderID) raises(PStorageException);

File on storing device is opened for writing
   FileStream openRead(in String filename) raises(PStorageException);
   FileStream openRead(in String filename, in String ContentsID, in String ProviderID) raises(PStorageException);

File on storing device is opened for reading
   static void setDefaultMode(in String ContentsID, in String ProviderID);

In Create,Delete,Exist,openWrite,openRead, default value obtained when ContentsID and ProviderID are not apparently designated is set.

An example in which the script 202 in FIG. 4 is described as ECMAScript by using these methods will be described below.

```
function createdata( ){
    Pstorage[ ] devices = getDevices(PStorage.REMOVABLE);
    if(devices.length == 0){
        error("SD card cannot be recognized"); return false;
    }
    if(devices[0].getFreeSpace( ) < 100) {
        error("capacity is short"); return false;
    }
    String providerID = "594f803b380a41396ed63dca39503542";
    String contentsID = "74b87337454200d4d33f80c4663dc5e5";
    String filename = "screenshot.jpg";
    try{
        devices[[0].Create(filename, 100, contents ID, providerID);
        FileStream stream = devices[0].OpenWrite(filename,
contentsID, providerID);
    }catch(PStorage Exception e){
        error ("File has been present, or access violation"); return
false;
    }
    /* data is written in stream instance */
    ...
    stream.close( );
    return true;
}
```

An example in which the script 202 in FIG. 5 is described as ECMAScript by using these methods will be described below.

```
function readdata( ){
    Pstorage[ ] devices = getDevices(PStorage.REMOVABLE);
    if(devices.length == 0{
        error("SD card cannot be recognized"); return false;
    }
    String providerID = "594f803b380a41396ed63dca39503542":
    String contentsID = "74b87337454200d4d33f80c4663dc5e5";
    String filename = "screenshot.jpg";
    try{
        FileStream stream = devices[0].OpenRead(filename,
contentsID, providerID);
    }catch (PStorageException e){
        error("File is absent, or access violation"); return false;
    }
    /* Data is read for stream instance, and displayed on screen */
    ...
    stream.close( );
    return true;
}
```

When a plurality of storing devices identified as PStorage.REMOVABLE are present, storing devices simply expressed by devices[0] are used in the description. However, for example, a process of checking a free space by getFreeSpace( ) to automatically select a storing device having sufficient free space, a process of checking the name of the storing device by getName( ) to automatically select a storing device having a specific name, and a process of showing a screen to a user to cause the user to select a storing device can also be described.

In the embodiment described above, although contents are read out from a DVD, contents supplied by digital television broadcasting (data carrier) may be received, and the received contents may be read.

As described above, according to the embodiment, reading/writing to a file in a storing device is limited by a contents ID, a provider ID, or a combination thereof. For this reason, reading/writing to the file can be rejected from being performed by contents which do not know the contents ID, the provider ID, or the combination thereof. More specifically, the data of the file can be prevented from being getting or deleted by a malicious user who does not know the contents ID, the provider ID, or the combination thereof.

Second Embodiment

In the first embodiment, an access limiting function is introduced into data reading/writing from contents to each storing device, data can be prevented from being stolen by malicious contents. In the second embodiment, as an application of the first embodiment, an example in which a home electric appliances, AV devices, and toys which can be controlled through a network are controlled in cooperation with contents will be described.

Figure 9:
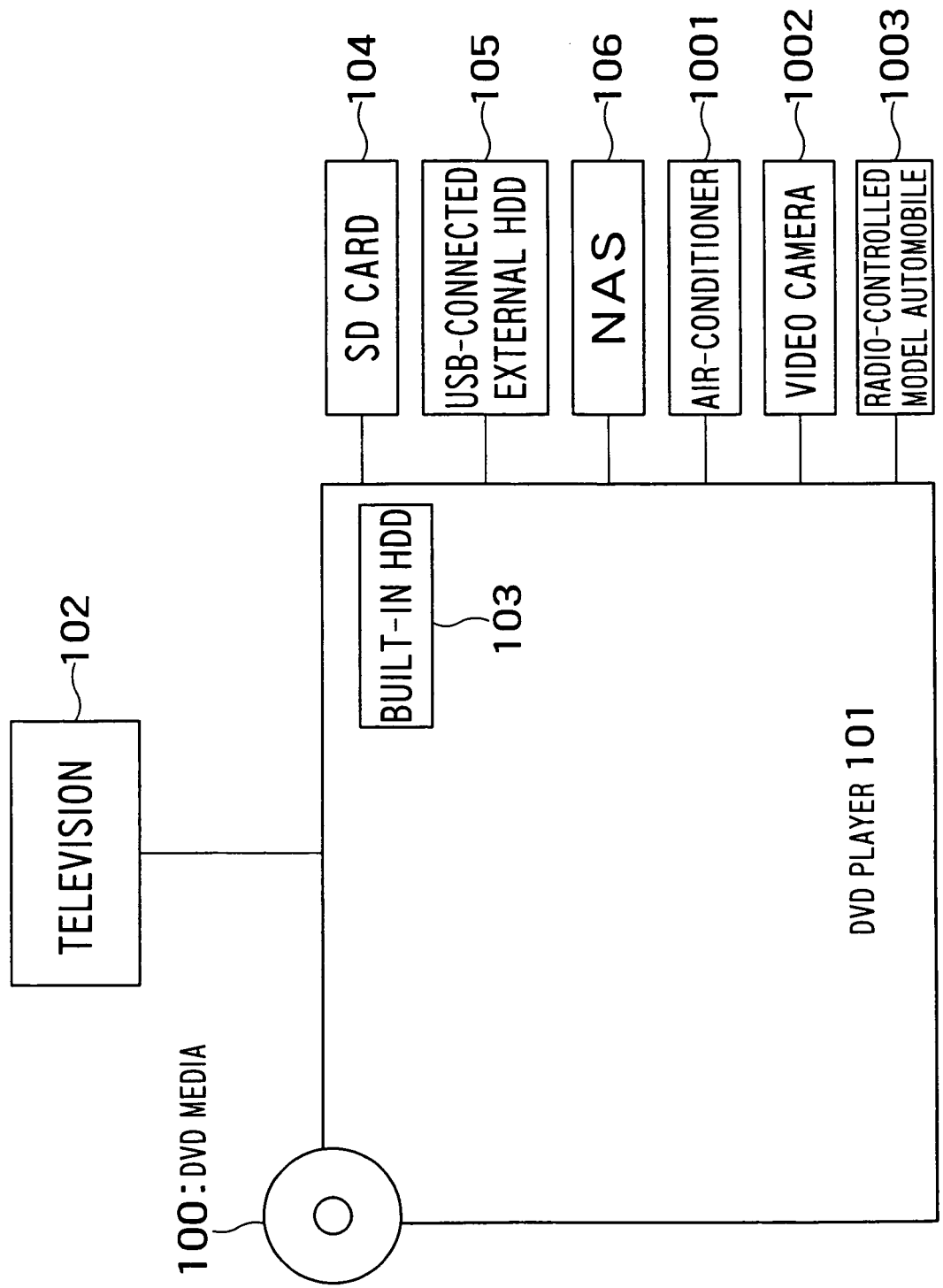
FIG. 9 is a block diagram schematically showing a configuration of a device control system including a contents player according to the embodiment.

FIG. 9 is a block diagram schematically showing a configuration of a device control system including a contents player according to the embodiment.

In FIG. 9, an air-conditioner (home electric appliance) 1001, a video camera (AV device) 1002, and a radio-controlled model automobile (toy) 1003 are added to the configuration of FIG. 1.

The air-conditioner 1001, the video camera 1002, and the radio-controlled model automobile 1003 are devices to be controlled through a network. The devices 1001 to 1003 to be controlled are connected to the DVD player 101 by USB connection or connected to each other by a LAN through an Ethernet or a wireless LAN.

The air-conditioner 1001 or the video camera 1002 are controlled by a control protocol such as ECHONET (trademark) or UPnP (trademark).

The radio-controlled model automobile 1003 has an internal storing unit (not shown) having the same file system as that of an ordinary storing device and holds specific files status.txt and control.txt which cannot be deleted in the internal storing unit. The radio-controlled model automobile 1003 has three states, i.e., "forward", "backward", and "stop". In the file status.txt, any one of these character strings "forward", "backward", and "stop" representing the states of the radio-controlled model automobile 1003 is stored on real time by a function of the radio-controlled model automobile 1003. The radio-controlled model automobile 1003 monitors the contents of the file control.txt and has a function of performing an operation depending on the contents of the file control.txt. In the file control.txt, any one of the character strings "forward", "backward", and "stop" is written by DVD player 101.

A method of controlling the radio-controlled model automobile 1003 by contents will be described below in detail. In the control of the radio-controlled model automobile 1003, from the script of the contents, the radio-controlled model automobile 1003 is handled as one of storing devices. More specifically, from the script, the radio-controlled model automobile 1003 is consistently controlled as reading/writing of a file from/in a storing device.

Figure 10:
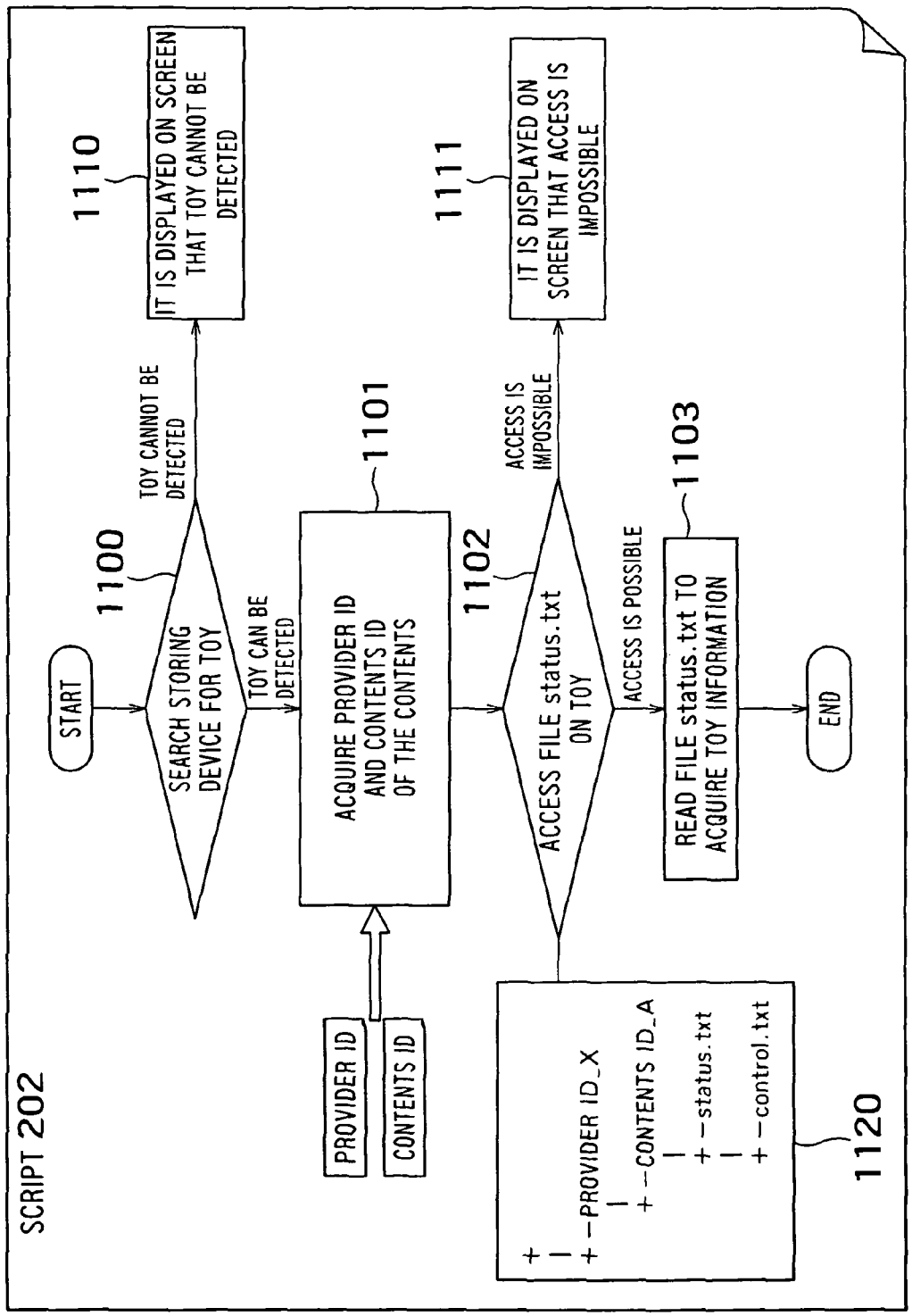
FIG. 10 is a diagram showing a process flow when a radio-controlled model car is controlled from a script.

FIG. 10 is a flow chart showing a process flow executed when the radio-controlled model automobile 1003 is controlled by the script 202.

A process of detecting whether the radio-controlled model automobile 1003 is connected or not (1100), a process performed when the radio-controlled model automobile 1003 is connected (1110), and a process of acquiring a provider ID and a contents ID when the radio-controlled model automobile 1003 is connected are the same as the procedures 500, 510, and 501 in FIG. 5. For this reason, a detailed description of these processes will be omitted.

In the embodiment, as described above, the radio-controlled model automobile 1003 has an internal storing unit having the same file system as that of an ordinary storing device, and holds a file status.txt having a state of the radio-controlled model automobile 1003 and a file control.txt having information for controlling the radio-controlled model automobile 1003 in the internal storing unit. More specifically, these files have the following directory structures:

/providerID_X/contentsID_A/status.txt
/providerID_X/contentsID_A/control.txt, and are stored in the internal storing unit (1120).

Therefore, the files status.txt and control.txt can be accessed by only contents having a provider ID=X and a contents ID=A (1102).

The contents having the provider ID=X and the contents ID=A can acquire a state ("forward", "backward", or "stop") of the radio-controlled model automobile 1003 at the present by reading out data from the file status.txt (1103). Similarly, the contents having the provider ID=X and the contents ID=A write data ("forward", "backward", or "stop") in the file control.txt to make it possible to operate the radio-controlled model automobile 1003.

More specifically, in the second embodiment, by the same mechanism as that of the access limiting mechanism in the fist embodiment, only the contents having the provider ID=X and the contents ID=A can control the radio-controlled model automobile 1003. More specifically, the radio-controlled model automobile 1003 in a house can be prevented from being freely operated by playing of illegal contents.

The above description shows the example in which the radio-controlled model automobile 1003 on which the same file system as that of an ordinary storing device is mounted is controlled. An example in which the air-conditioner 1001 or the video camera 1002 serving as a network device compatible with ECHONET (trademark) or UPnP (trademark) is controlled by the script 202.

For example, in the air-conditioner 1001 compatible with ECHONET, at a time of device detection by the storage device information collector 303, device detection by ECHONET is also performed, and an ECHONET address (address for uniquely specifying an ECHONET device) of the air-conditioner 1001 mapped on an instance given to the script 202 is stored in the corresponding information storing device 307.

The data read/write unit 306 exhibits a virtual file which seems as if the file control.txt is present to the script 202. The virtual file is stored in the internal storing unit (not shown) of, e.g., the data read/write unit 306. However, it is assumed that access to the file control.txt is permitted by the same access limiting mechanism as that in the first embodiment. The script 202 writes the following data in the virtual file (virtual control.txt).

eoj = 0x013001
epc = 0x80
data = 0x31

In ECHONET, when the ECHONET address and information of these eoj (ECHONET object code), epc (ECHONET property code), and data (data given to property) are present, composition of an ECHONET packet and specification of a transmission destination can be executed.

A process of writing data in the virtual control.txt described in the script 202 and executed by the script executing unit 302 is interpreted by the data read/write unit 306 as a process of transmitting the ECHONET packet. The data read/write unit 306 generates an ECHONET packet for controlling the air-conditioner 1001 on the basis of the data written in the virtual control.txt and transmits the ECHONET packet to the air-conditioner 1001. In this manner, control of the air-conditioner 1001 can be realized.

The above describes the example in which the air-conditioner 1001 is controlled. However, control of the video camera 1002 by the script 202 can be realized as in the air-conditioner 1001 except that the different protocols are used.

What is claimed is:

1. A contents player comprising:
   a reading unit which accesses a data carrier and reads out contents including multimedia data and a script from the data carrier;
   a playing unit which plays the multimedia data included in the contents;
   an interpreting unit which interprets the script included in the contents;
   an acquiring unit
      which acquires an access ID of contents from the script via the interpreting unit when the script includes an allocation request description requesting allocation of a data storing region in an internal or external storing device and generates access right managing information specifying the access ID as an ID accessible to the requested data storing region, and
      which acquires an access ID of contents from the script via the interpreting unit when the script includes an access instruction description instructing access to a data storing region in the storing device;
   an access unit which accesses the storing device and generates the requested data storing region in the storing device when the script includes the allocation request description; and
   a determining unit which determines whether the access to the data storing region is permitted or not when the script includes the access instruction description, based on the access right managing information and the access ID acquired from the script which includes the access instruction description,
   wherein the access ID acquired by the acquiring unit is an access ID of the contents read out by the reading unit or an access ID of different contents from the contents read out by the reading unit; and
   wherein the access ID includes a provider ID, a contents ID or both of the provider ID and the contents ID; and
   wherein when the script includes the allocation request description, the acquiring unit generates in the storing device a directory structure including the access ID and identification information of the data storing region, and further comprising:
   a checking unit which checks whether a directory structure including the access ID and identification information of the data storing region is present in the storing device or not when the script includes the access instruction description, and wherein
   the determining unit permits the access to the data storing region when the directory structure is present in the storing device.

2. The contents player according to claim 1, wherein the storing device is a storing device inserted into an external slot or a storing device connected through a network.

3. The contents player according to claim 1, wherein the script is described by XML and ECMAScript, or XML and JavaScript.

4. The contents player according to claim 1, further comprising:
   a communication unit which communicates with a device to be controlled through a network; and
   a control data generating unit which generates control data for controlling the device to be controlled on the basis of data written in the data storing region when the data is written in the storing region by the access unit, and wherein
   the communication unit transmits the generated control data to the device to be controlled.

5. A non-transitory computer readable storage medium including computer executable instructions causing a computer to execute operations of:
   accessing a data carrier and reading out contents including multimedia data and a script from the data carrier;
   playing the multimedia data included in the contents;
   interpreting the script included in the contents;
   acquiring an access ID of contents from the script when the script includes an allocation request description requesting allocation of a data storing region in an internal or external storing device, generating access right managing information specifying the access ID as an ID accessible to the requested data storing region, and generating the requested data storing region in the storing device; and
   acquiring an access ID of contents from the script when the script includes an access instruction description instructing access to a data storing region in the storing device, and determining whether the access to the data storing region is permitted or not, based on the acquired access ID and the access right managing information,
   wherein the acquired access ID is an access ID of the contents read out from the data carrier or an access ID of different contents from the contents read out from the data carrier; and
   wherein the access ID includes a provider ID, a contents ID or both of the provider ID and the contents ID; and
   generating in the storing device a directory structure including the access ID and identification information of the data storing region when the script includes the allocation request description; and
   checking whether a directory structure including the access ID and identification information of the data storing region is present in the storing device or not when the script includes the access instruction description, and
   wherein the access to the data storing region is permitted when the directory structure is present in the storing device.

6. The non-transitory computer readable storage medium according to claim 5, wherein
   as the script, a description by XML and ECMAScript or XML and JavaScript are interpreted.

7. A method comprising:
   accessing a data carrier and reading out contents including multimedia data and a script from the data carrier;
   playing the multimedia data included in the contents;
   interpreting the script included in the contents;
   acquiring an access ID of contents from the script when the script includes an allocation request description requesting allocation of a data storing region in an internal or external storing device, generating access right managing information specifying the access ID as an ID accessible to the requested data storing region, and generating the requested data storing region in the storing device; and acquiring an access ID of contents from the script when the script includes an access instruction description instructing access to a data storing region in the storing device, and determining whether the access to the data storing region is permitted or not, based on the acquired access ID and the access right managing information, wherein the acquired access ID is an access ID of the contents read out from the data carrier or an access ID of different contents from the contents read out from the data carrier; and wherein the access ID includes a provider ID, a contents ID or both of the provider ID and the contents ID; and generating in the storing device a directory structure including the access ID and identification information of the data storing region when the script includes the allocation request description; and checking whether a directory structure including the access ID and identification information of the data storing region is present in the storing device or not when the script includes the access instruction description, and wherein the access to the data storing region is permitted when the directory structure is present in the storing device.

* * * * *